United States Patent
Matsumura et al.

(10) Patent No.: US 6,467,304 B2
(45) Date of Patent: Oct. 22, 2002

(54) REFRIGERATION CYCLE

(75) Inventors: Kenji Matsumura, Shimizu; Susumu Nakayama, Shizuoka, both of (JP)

(73) Assignee: Hitachi Air Conditioning Systems Co., Ltd., Chiyoda-ku (JP)

( * ) Notice: Subject to any disclaimer, the term of this patent is extended or adjusted under 35 U.S.C. 154(b) by 0 days.

(21) Appl. No.: 09/855,676

(22) Filed: May 16, 2001

(65) Prior Publication Data

US 2002/0029581 A1 Mar. 14, 2002

(30) Foreign Application Priority Data

Sep. 8, 2000 (JP) .................................... 2000-278660

(51) Int. Cl.⁷ ............................. F25B 39/04; F25B 7/00; F25B 41/00; F25B 1/00
(52) U.S. Cl. ............................. 62/509; 62/114; 62/175; 62/197; 62/502
(58) Field of Search ................ 62/114, 149, 175, 62/197, 207, 277, 324.1, 509

(56) References Cited

U.S. PATENT DOCUMENTS

| | | | |
|---|---|---|---|
| 2,938,362 A | | 5/1960 | Schwind |
| 4,722,195 A | * | 2/1988 | Suzuki ........................ 62/149 |
| 4,840,042 A | * | 6/1989 | Ikoma ....................... 62/324.1 |
| 4,843,837 A | * | 7/1989 | Ogawa ...................... 62/324.1 |
| 4,913,714 A | | 4/1990 | Ogura |
| 4,972,676 A | | 11/1990 | Sakai |
| 5,309,732 A | * | 5/1994 | Sami ............................ 62/277 |
| 5,353,604 A | * | 10/1994 | Oguni ......................... 62/207 |
| 5,499,508 A | * | 3/1996 | Aari ............................. 62/114 |
| 5,551,255 A | | 9/1996 | Rothfleisch |
| 5,647,224 A | * | 7/1997 | Kushiro ....................... 62/197 |
| 6,003,323 A | * | 12/1999 | Sumida ........................ 62/175 |

FOREIGN PATENT DOCUMENTS

| | | | |
|---|---|---|---|
| DE | 3406588 | 8/1985 | |
| EP | 0838643 | 4/1998 | |
| JP | 406101912 A | * 4/1994 | .................. 62/114 |

\* cited by examiner

*Primary Examiner*—William C. Doerrler
*Assistant Examiner*—Filip Zec
(74) *Attorney, Agent, or Firm*—Antonelli, Terry, Stout & Kraus, LLP (57) ABSTRACT

In order to magnify capacity control of a refrigeration cycle for an increased efficiency and achievement of compactness, the refrigeration cycle includes a compressor, a four-way valve, a heat exchanger on a side of a heat source, a liquid receiver, a heat exchanger on a side of use, and an electronic expansion valve, all of which are connected other by pipes, and comprises a refrigerant circulating in the refrigeration cycle and being a non-azeotropic refrigerant, a second liquid receiver for taking out a refrigerant vapor from an upper portion of the liquid receiver to condense and store the refrigerant, and a pipe connecting the second liquid receiver to the liquid receiver via a shut-off valve.

6 Claims, 7 Drawing Sheets

REFRIGERATION CYCLE

BACKGROUND OF THE INVENTION

The present invention relates to a refrigeration cycle using a non-azeotropic refrigerant, and more particularly, to a refrigeration cycle suitable for a decrease in capacity and an increase in operation efficiency by changing the composition of a refrigerant circulating in the refrigeration cycle at low load.

PRIOR ART

Conventionally, in order to exhibit a capacity conformed to load, a compressor is inverter-driven to change the mass flow rate of a refrigerant circulating in a refrigeration cycle. Another system, in which a non-azeotropic refrigerant is used as a refrigerant and a distiller is used to change the composition of the refrigerant for production of a capacity suitable for load at all times, is known and disclosed in, for example, Japanese Patent Unexamined Publication No. 9-196481.

In the above-described prior art, the system adapted for capacity control through inverter-driving is difficult to operate at very low and very high speeds of compressor, so that it cannot but entail upper and lower limits in inverter frequency. Therefore, capacity control is effected by making the compressor on/off particularly at low load, thus leading to a poor efficiency. Also, with the system using a distiller, the distiller and a separation circuit thereof are large in scale to make it difficult for the system to be rendered compact in size.

BRIEF SUMMARY OF THE INVENTION

An object of the present invention is to magnify capacity control for an increased efficiency and achievement of compactness. Another object of the present invention is to magnify the capacity on a side of low load to afford an energy-saving operation for a reduction in annual power consumption and adaptation to environment, such as prevention of destruction of ozone layer and an increase in recycle efficiency.

In order to solve the above problems, the present invention provides a refrigeration cycle composed of a compressor, a four-way valve, a heat exchanger on the heat source side, a liquid receiver, a heat exchanger on the use side, and an electronic expansion valve, which are connected by piping, the refrigeration cycle comprising a refrigerant being a non-azeotropic refrigerant to circulate therein, a second liquid receiver for taking out a refrigerant vapor from an upper portion of the liquid receiver to condense and store the refrigerant, and a pipe for connecting the second liquid receiver to the liquid receiver via a shut-off valve.

Thus, the use of a non-azeotropic refrigerant (for example, a HFC refrigerant mixture such as R407C having an ozone layer destruction coefficient of zero) results in that the refrigerant vapor in the liquid receiver contains much low boiling point refrigerant in composition and an amount of the refrigerant stored in the second liquid receiver and containing an abundant amount of low boiling point refrigerant can be changed by the opening and closing actions of the shut-off valve, so that the capacity of an air conditioner can be controlled by changing the composition ratio of a refrigerant circulating in the refrigeration cycle, and also a refrigerant rectifying column can be dispensed with which serves as separating components of the refrigerant mixture depending upon differences in boiling point among the respective component and which is liable to become large-sized, complicated, and expensive. Therefore, the number of on/off operations of an associated compressor can be decreased by increasing the capacity control range without hindering the compactness of an air conditioner, so that the air conditioner can be enhanced in efficiency and comfort.

Also, the present invention provides a refrigeration cycle having a compressor, a heat exchanger on a side of a heat source, an electronic expansion valve, and a heat exchanger on a side of use, and using a non-azeotropic refrigerant as a circulating refrigerant, the refrigeration cycle comprising a liquid receiver provided between the heat exchanger on the heat source side and the heat exchanger on the side of sue, and a second liquid receiver connected to an upper portion of the liquid receiver through a pipe, and wherein a refrigerant vapor, in which a low boiling point refrigerant is rich, is taken out from the liquid receiver, and the taken-out refrigerant is condensed and stored or returned to the refrigeration cycle, whereby the refrigerant circulating in the refrigeration cycle is changed in composition.

Further, in the above-described refrigeration cycle, the refrigerant vapor is preferably caused to make heat exchange with a refrigerant on a suction side of the compressor to thereby be condensed.

Further, in the above-described refrigeration cycle, the second liquid receiver is desirably connected to the suction side of the compressor via a second shut-off valve and a pressure reducing mechanism.

Further, the above-described refrigeration cycle desirably further comprises a heat exchanger for heat exchanging the refrigerant vapor with a refrigerant on the suction side of the compressor, a shut-off valve provided between the liquid receiver and the heat exchanger, and a pipe connecting the second liquid receiver to the suction side of the compressor via a pressure reducing mechanism.

Further, the above-described refrigeration cycle desirably further comprises a heat exchanger for heat exchanging the refrigerant vapor with a refrigerant on the suction side of the compressor, a shut-off valve provided between the liquid receiver and the heat exchanger, a pipe connecting the second liquid receiver to the suction side of the compressor via a pressure reducing mechanism, and a pipe connecting the liquid receiver to the second liquid receiver.

Further, the above-described refrigeration cycle desirably further comprises a heat exchanger for heat exchanging the refrigerant vapor with a refrigerant on the suction side of the compressor: and a check valve provided between the liquid receiver and the heat exchanger.

Further, the present invention provides a refrigeration cycle including an outdoor unit provided with a compressor and a heat exchanger on a side of a heat source, and a plurality of indoor units, and using a non-azeotropic refrigerant as a circulating refrigerant, the refrigeration cycle comprising a liquid receiver provided between the heat exchanger on the heat source side and the indoor units, and a second liquid receiver connected to the liquid receiver via a pipe, and wherein a refrigerant vapor, in which a low oiling point refrigerant is rich, is taken out from he liquid receiver and the taken-out refrigerant is condensed and stored, whereby the refrigeration cycle is operated with a high ratio of a high boiling point refrigerant contained in the refrigerant circulating in the refrigeration cycle.

Further, the present invention provides a refrigeration cycle including an outdoor unit provided with a compressor and a heat exchanger on a side of a heat source, and a plurality of indoor units, the refrigeration cycle comprising a refrigerant circulating in the refrigeration cycle, and being a non-azeotropic refrigerant, and a liquid receiver provided between the heat exchanger on the heat source side and the indoor units, and wherein a refrigerant vapor, in which a low boiling point refrigerant is rich, is taken out from the liquid receiver at low load, and the taken-out refrigerant is condensed and stored, whereby the number of times, in which the compressor is made off, is reduced.

DETAILED DESCRIPTION OF PREFERRED EMBODIMENTS

Embodiments of the present invention will now be described in detail with reference to FIGS. 1 to 7.

Figure 1:
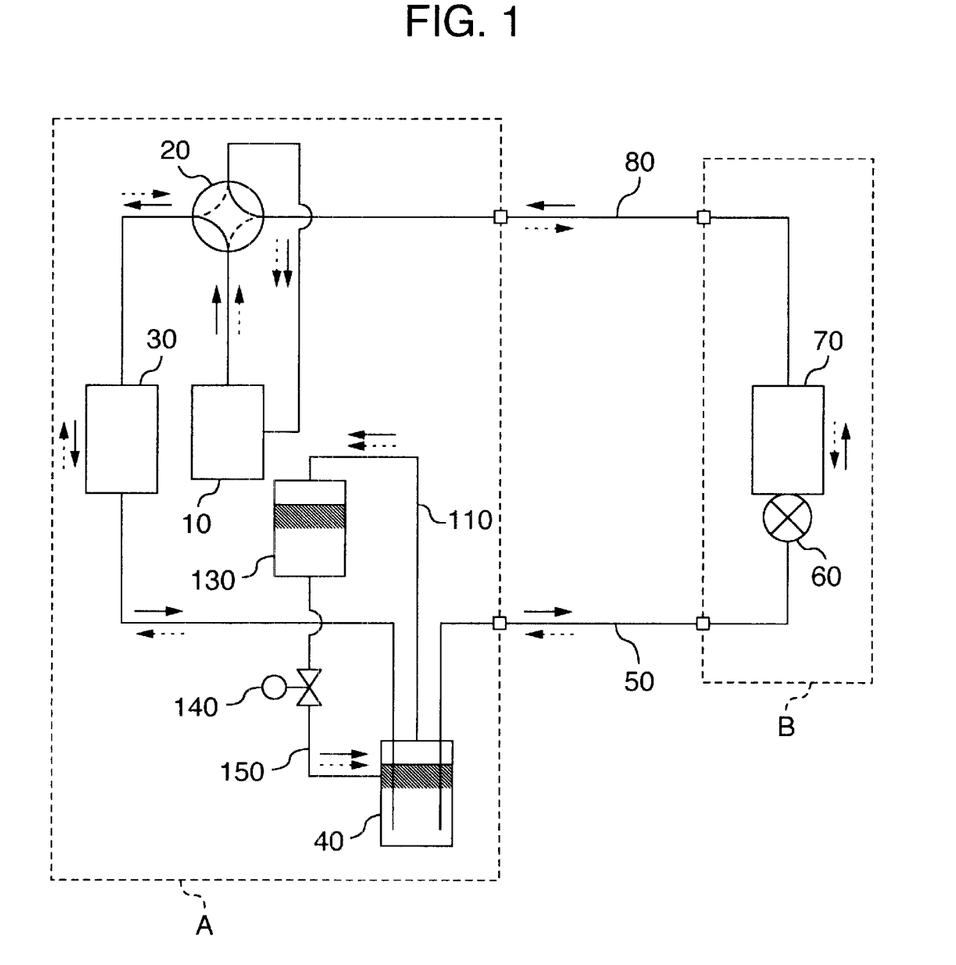
FIG. 1 is a schematic diagram showing an embodiment of the present invention.

FIG. 1 shows an embodiment. In FIG. 1, the reference character A denotes an outdoor unit, and B an indoor unit. The reference numeral 10 denotes a compressor, 20 a four-way valve for switching the flow direction of a refrigerant according to the heating and cooling operations, 30 a heat exchanger on a heat source side, 40 a (first) liquid receiver, 50 a liquid connection pipe, 60 an electronic expansion valve in the indoor unit, 70 a heat exchanger on a use side, 80 a gas connection pipe, 130 a second liquid receiver for storing a condensate containing an abundant amount of a low boiling point liquid, 110 a pipe for directing a refrigerant vapor in the first liquid receiver 40 to a second liquid receiver 130, and 150 a pipe for directing a liquid refrigerant in the second liquid receiver 130 to the first liquid receiver 40, and connected from a lower portion of the liquid receiver 130 to the liquid receiver 40 via a shut-off valve 140. The second liquid receiver 130 is installed above the first liquid receiver 40. Arrows in the drawings indicate the direction, in which a refrigerant flows, solid lines indicating a cooling operation and broken lines indicating a heating operation.

Since the refrigerant circulating in the refrigeration cycle is a non-azeotropic refrigerant, a refrigerant vapor accumulating in an upper portion of the first liquid receiver 40 has that composition, in which a low boiling point refrigerant is rich, due to the low boiling point refrigerant being more liable to vaporize than a high boiling point refrigerant. When the shut-off valve 140 is closed, the refrigerant vapor, in which the low boiling point refrigerant is rich, in the first liquid receiver 40 performs heat exchange with the outside air to be stored in the second liquid receiver 130. As a result, the refrigerant circulating in the refrigeration cycle becomes lean in the low boiling point refrigerant and so circulates with a high ratio of the high boiling point refrigerant in composition.

When the shut-off valve 140 is opened, due to the second liquid receiver 130 being installed above the first liquid receiver 40, the liquid refrigerant in the second liquid receiver 130 returns to the first liquid receiver 40 through the pipe 150 under gravity. therefore, the low boiling point refrigerant does not accumulate in the second liquid receiver 130, and so he composition in the refrigeration cycle does not change.

As described above, if a liquid refrigerant, in which the low boiling point refrigerant is rich, is stored in the second liquid receiver 130 at low load, a refrigerant of that composition, in which the high boiling point refrigerant is rich, circulates in the main refrigeration cycle. Therefore, the refrigeration cycle can be decreased in capacity and so the on/off operation of the compressor can be reduced for an increased in efficiency. Also, the shut-off valve 140 is opened at high load to permit a refrigerant, in which the low boiling point refrigerant is rich, to be returned to the main refrigeration cycle, so that the refrigerant circulating in the refrigeration cycle is restored with respect to composition to enable increasing the capacity.

Figure 2:
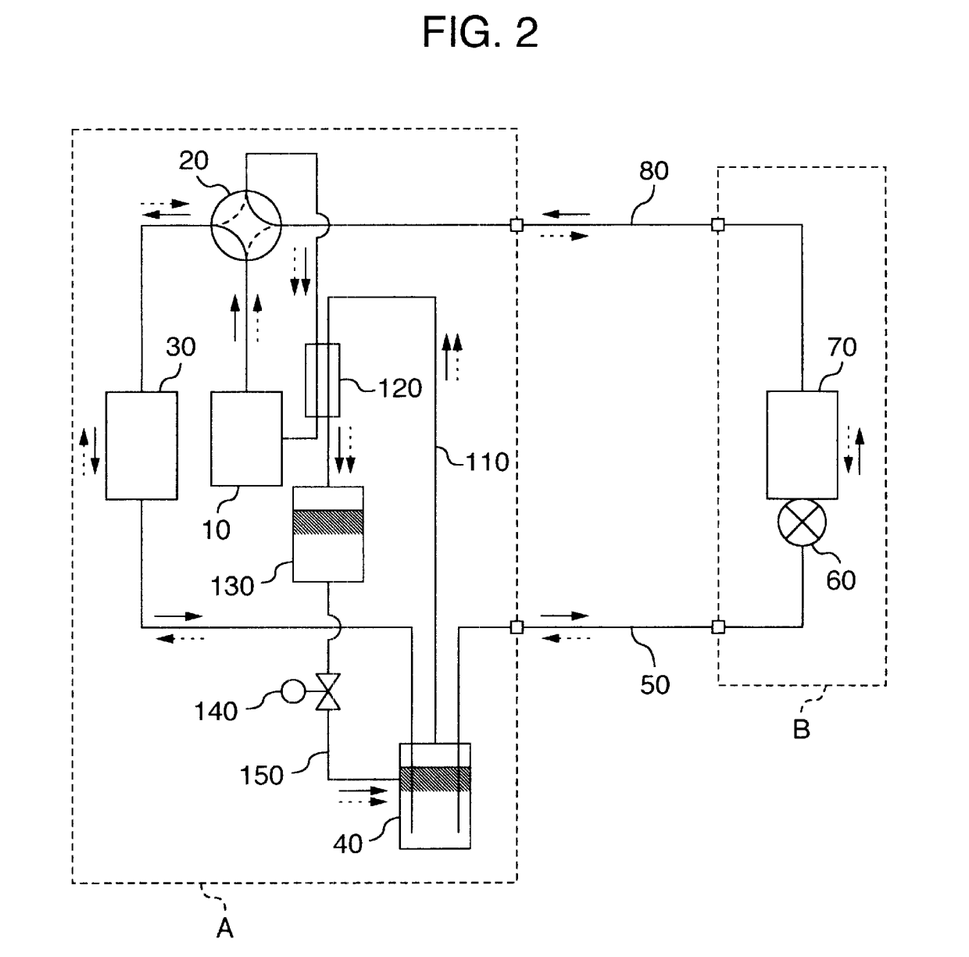
FIG. 2 is a schematic diagram showing another embodiment of the present invention.

FIG. 2 shows a second embodiment, in which the reference numeral 120 denotes a heat exchanger for making heat exchange between the refrigerant vapor from the first liquid receiver 40 and a refrigerant sucked into the compressor 10. The refrigerant vapor in the first liquid receiver 40 is liquefied by heat exchange with the outside air in the above-described embodiment, but it does not liquefy under the condition that the outside air is high in temperature. Hereupon, when the refrigerant vapor is caused to make heat exchange with a refrigerant on a suction side of the compressor where the refrigerant is always made low in temperature, the refrigerant is changed in composition independently of the outside air temperature to make the capacity variable.

Figure 3:
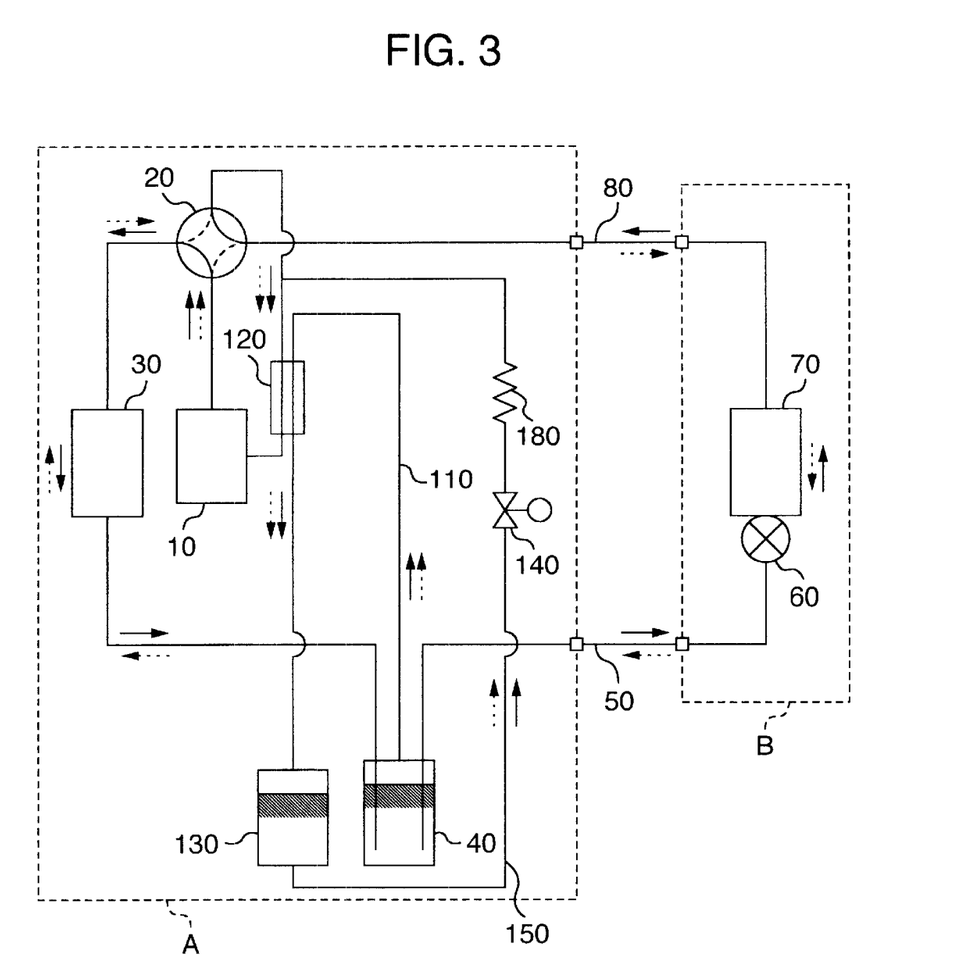
FIG. 3 is a schematic diagram showing still another embodiment of the present invention.

FIG. 3 shows still another embodiment, in which the pipe 150 communicated to the liquid in the second liquid receiver 130 is connected to the compressor suction side via the shut-off valve 140 and a capillary 180.

In the embodiment shown in FIG. 1 or 2, gravity is used to remove the liquid refrigerant in the second liquid receiver 130, so that there is imposed a restriction that a liquid level in the second liquid receiver 130 should be higher than that in the first liquid receiver 40. In this embodiment, however, the liquid refrigerant stored in the second liquid receiver 130 is returned to the compressor suction side through the capillary by virtue of a pressure difference, and so the positional relationship between the first and second liquid receivers becomes free of any restrictions. While the pipe 150 connects to an suction pipe this side of the heat exchanger 120 in FIG. 3, it may be also connected to the suction pipe that side of the heat exchanger 120 and between the compressor 10 and the heat exchanger 120.

Figure 4:
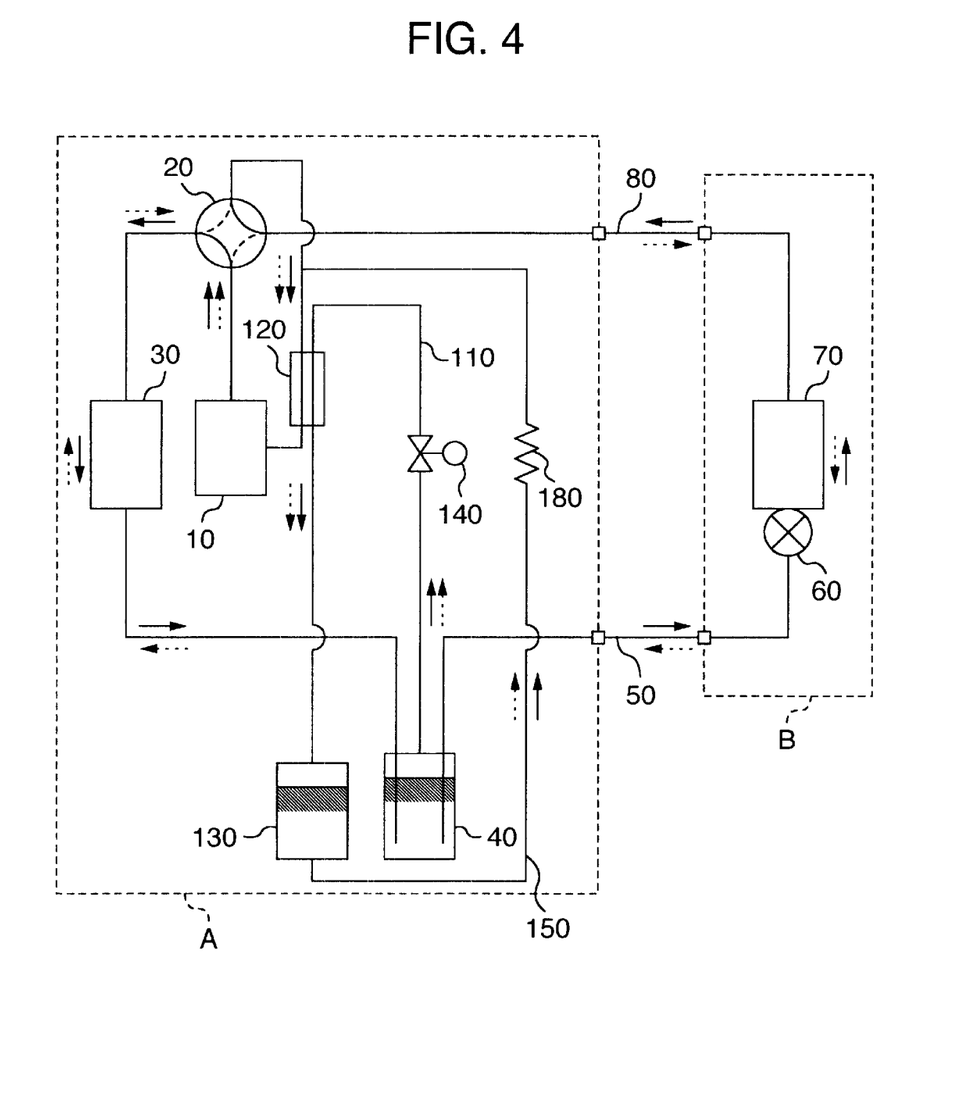
FIG. 4 is a schematic diagram showing a further embodiment of the present invention.

FIG. 4 shows still another embodiment. When he circulating refrigerant should not be changed in composition, the shut-off valve 140 is opened to remove he liquid refrigerant in the second liquid receiver 130 in the embodiment shown in FIG. 3. Consequently, the refrigerant vapor in the first liquid receiver 40 will bypass the compressor 10. In the present embodiment, when the liquid refrigerant in the second liquid receiver 130 is to be removed, the shut-off valve 140 is closed to render an interior of the second liquid receiver 130 low in pressure, whereby the liquid refrigerant is vaporized. When the liquid refrigerant is to be stored in the second liquid receiver 130, the shut-off valve 140 is opened to permit the refrigerant vapor in the first liquid receiver 40 to be liquefied by the heat exchanger 120, and the resulting liquid refrigerant is stored in the second liquid receiver 130. And the liquid refrigerant in the second liquid receiver 130 is communicated to the compressor suction side through the capillary 180. However, the capillary 180 is made high in resistance so as to make the liquid accumulate in the second liquid receiver 130. Also, when the shut-off valve 140 is opened, the low boiling point refrigerant is returned to the high pressure side through the compressor 10, so that the refrigerant present in a path from the first liquid receiver to the compressor suction side and including an evaporator becomes rich in the high boiling point refrigerant. Therefore, the vaporizing pressure decreases and an amount of the refrigerant circulating in the refrigeration cycle decreases, whereby the capacity of he cycle can be further decreased.

Figure 5:
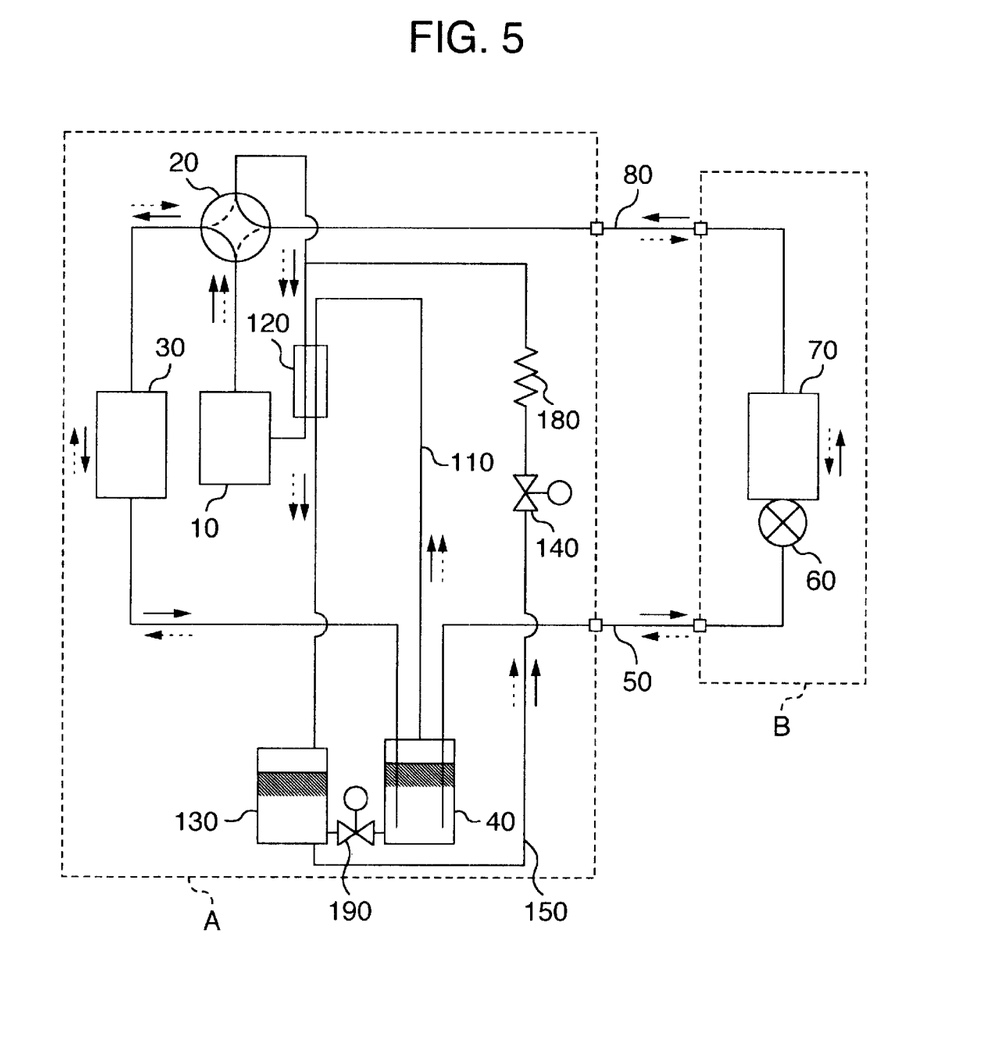
FIG. 5 is a schematic diagram showing a still further embodiment of the present invention.

FIG. 5 shows a still another embodiment. In contrast to the embodiment shown in FIG. 4, a pipe for providing communication between the liquid in the first liquid receiver 40 and the liquid in the second liquid receiver 130 is provided with a shut-off valve 190 for communication. In the above-described embodiments shown in FIGS. 1 to 4, since the refrigerant preserved in the second liquid receiver 130 varies greatly in amount, the first liquid receiver 40 must be enlarged by a magnitude conformed to the varying amount of the refrigerant. In this embodiment, when no change is to be made in composition, the shut-off valve 190 is opened to permit a surplus refrigerant to be accumulated in both of the first liquid receiver 40 and the second liquid receiver 130, so that the first liquid receiver 40 need not be enlarged and so can be advantageously made small-sized.

Also, when some change is to be made in composition, the shut-off valve 190 is closed to prevent the liquid refrigerants in the first liquid receiver 40 and the second liquid receiver 130 from mixing with each other, so that the refrigerant can be made variable in composition.

Figure 6:
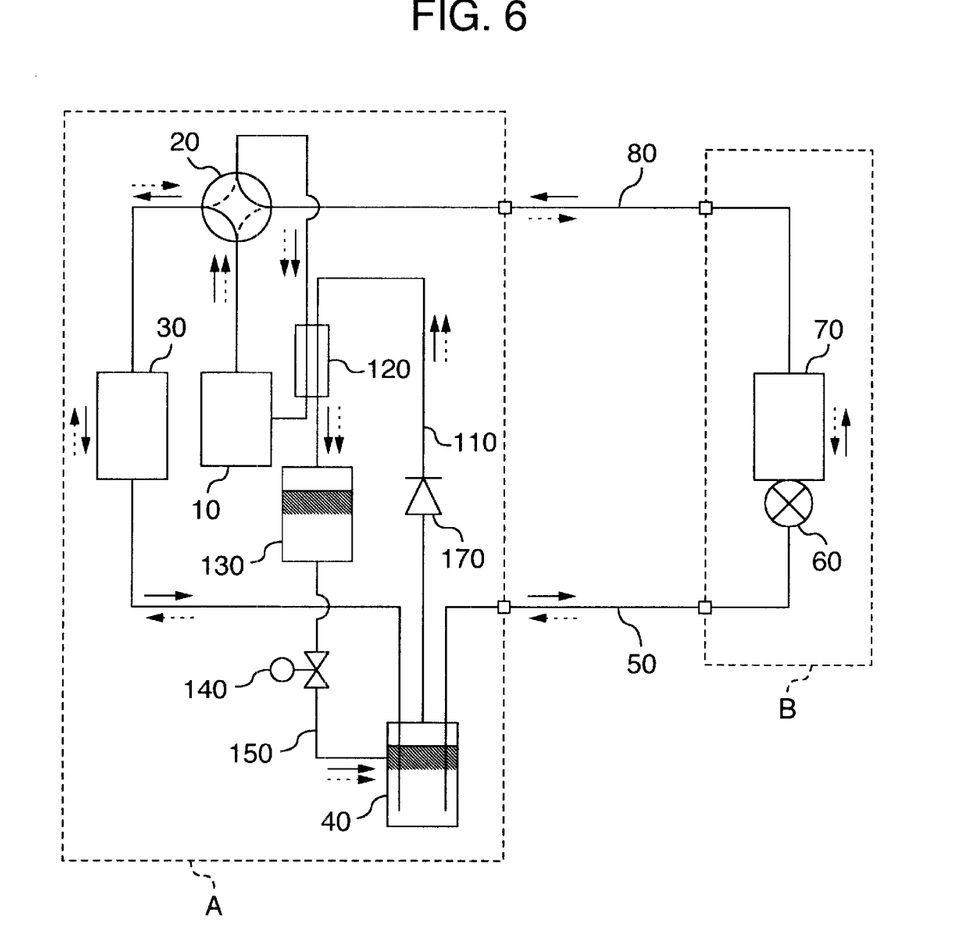
FIG. 6 is a schematic diagram showing still another embodiment of the present invention.

FIG. 6 shows still another embodiment, in which a check valve 170 is provided on the pipe 110 to prevent any couterflow, and the refrigerant in the second liquid receiver 130 is caused to make heat exchange with the outside air even when the outside air is high in temperature, the liquid refrigerant therein being made to vaporize, whereby it is possible to prevent the low boiling point refrigerant from returning to the first liquid receiver 40. Also, the check valve may be replaced by a shut-off valve.

Figure 7:
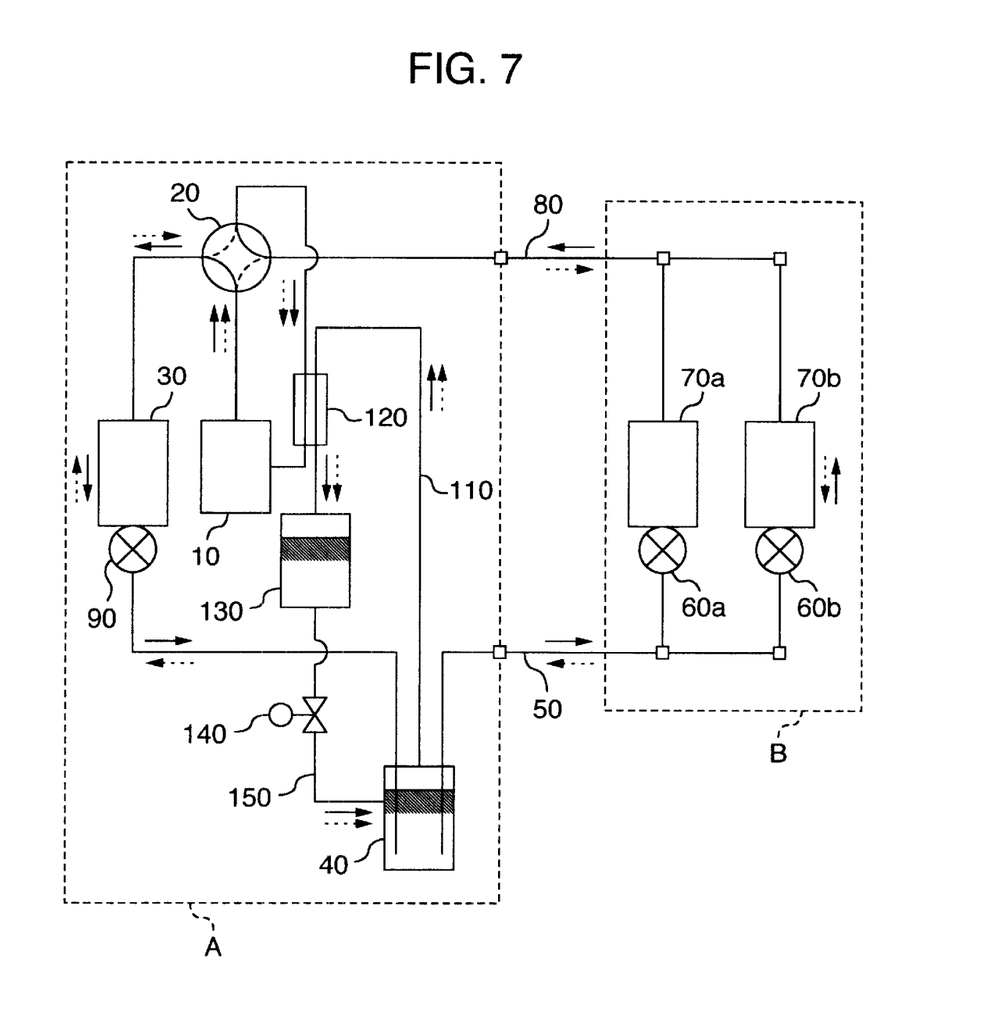
FIG. 7 is a schematic diagram showing still another embodiment of the present invention.

FIG. 7 shows still another embodiment, which is a system having a plurality of indoor units B and an expansion valve in the outdoor unit A. Since the provision of the plurality of indoor units involves a large fluctuation in load, it is desirable to further increase a range of capacity control. A further increased range of capacity control can be obtained not only by using an inverter to make the rotational speed of the compressor 10 variable, but also by making the refrigerant circulating in the refrigeration cycle variable in composition.

Further, while the second liquid receiver is provided to store therein a refrigerant, in which the low boiling point refrigerant is rich, in the above-described embodiments, piping may be made to substantially store the refrigerant therein.

What is claimed is:

1. A refrigeration cycle comprising a compressor, a four-way valve, a heat exchanger on a side of a heat source, an electronic expansion valve, and a heat exchanger on a side of use which are connected by piping, the refrigeration cycle further comprising:

a refrigerant being a non-azeotropic refrigerant to circulate therein;

a first liquid receiver provided between said heat exchanger on the heat source side and said electronic expansion valve and storing a refrigerant vapor in an upper part thereof and a liquid refrigerant in a lower part thereof;

a second liquid receiver for storing refrigerant;

a pipe for conducting the refrigerant vapor from said first liquid receiver, causing the refrigerant vapor to make heat exchange with the outside air to be condensed and delivering the condensed vapor to said second liquid receiver; and a pipe connecting a lower portion of the second liquid receiver to the first liquid receiver via a shut-off valve, wherein said shut-off valve can be closed at low load to cause a low boiling point refrigerant to be stored in said second liquid receiver for operation.

2. The refrigeration cycle according to claim 1, wherein said refrigerant vapor is caused to make heat exchange with a refrigerant on a suction side of said compressor to thereby be condensed.

3. The refrigeration cycle according to claim 1, wherein said second liquid receiver is connected to the suction side of said compressor via a second shut-off valve and a pressure reducing mechanism.

4. The refrigeration cycle according to claim 1, further comprising a heat exchanger for heat exchanging said refrigerant vapor with a refrigerant on the suction side of said compressor; a shut-off valve provided between said liquid receiver and said heat exchanger; and a pipe connecting said second liquid receiver to the suction side of said compressor via a pressure reducing mechanism.

5. The refrigeration cycle according to claim 1, further comprising a heat exchanger for heat exchanging said refrigerant vapor with a refrigerant on the suction side of said compressor; a shut-off valve provided between said liquid receiver and said heat exchanger; a pipe connecting said second liquid receiver to the suction side of said compressor via a pressure reducing mechanism; and a pipe connecting said liquid receiver to said second liquid receiver.

6. The refrigeration cycle according to claim 1, further comprising a heat exchanger for heat exchanging said refrigerant vapor with a refrigerant on the suction side of said compressor: and a check valve provided between said liquid receiver and said heat exchanger.

* * * * *

UNITED STATES PATENT AND TRADEMARK OFFICE
CERTIFICATE OF CORRECTION

PATENT NO. : 6,467,304 B2  Page 1 of 1
DATED : October 22, 2002
INVENTOR(S) : Matsumura et al.

It is certified that error appears in the above-identified patent and that said Letters Patent is hereby corrected as shown below:

<u>Title page,</u>
Item [73], Assignee, replace "Hitachi Air Conditioning Systems Co., Ltd., Chiyoda-ku (JP)" with -- Hitachi, Ltd., Tokyo (JP) trustee, for the benefit of Hitachi Air Conditioning Systems Co., Ltd., Chiyoda-ku (JP) --.

Signed and Sealed this

Twentieth Day of January, 2004

JON W. DUDAS
*Acting Director of the United States Patent and Trademark Office*